(12) United States Patent
Kakoschke et al.

(10) Patent No.: US 7,066,210 B2
(45) Date of Patent: Jun. 27, 2006

(54) COMPRESSION PIPE REPAIRING AND REINFORCING METHODS

(75) Inventors: Dale Kakoschke, Calgary (CA); Ruben Pavon, Coatzacoalcos (MX); Mirek Urednicek, Drasenhofen (AT)

(73) Assignee: BJ Services Company, Houston, TX (US)

( * ) Notice: Subject to any disclaimer, the term of this patent is extended or adjusted under 35 U.S.C. 154(b) by 384 days.

(21) Appl. No.: 10/619,836

(22) Filed: Jul. 15, 2003

(65) Prior Publication Data

US 2004/0011415 A1    Jan. 22, 2004

Related U.S. Application Data

(60) Provisional application No. 60/395,966, filed on Jul. 15, 2002.

(51) Int. Cl.
 *F16L 55/16* (2006.01)
(52) U.S. Cl. ............................ 138/99; 138/97; 138/167; 285/15; 285/373
(58) Field of Classification Search ................. 138/99, 138/98, 97, 167; 285/373, 15, 45, 419
See application file for complete search history.

(56) References Cited

U.S. PATENT DOCUMENTS

| | | | | |
|---|---|---|---|---|
| 2,164,011 A | | 6/1939 | Hilborn ........................... 47/2 |
| 2,188,302 A | * | 1/1940 | Pfefferie ...................... 138/99 |
| 3,954,288 A | * | 5/1976 | Smith ........................ 285/93 |
| 4,673,122 A | * | 6/1987 | Dubey ........................ 288/119 |
| 4,747,430 A | * | 5/1988 | Stata et al. ................... 138/97 |
| 4,756,338 A | * | 7/1988 | Guyatt et al. ................. 138/99 |
| 4,793,382 A | | 12/1988 | Szalvay ........................ 138/98 |
| 4,889,370 A | | 12/1989 | Firestone ..................... 285/342 |
| 5,199,464 A | * | 4/1993 | Savard ........................ 138/99 |
| 5,345,972 A | * | 9/1994 | Goglio et al. ................. 138/99 |
| 5,372,162 A | | 12/1994 | Frey .............................. 138/98 |
| 5,722,463 A | * | 3/1998 | Smyth et al. ............... 138/170 |
| 5,950,683 A | | 9/1999 | Henderson et al. .......... 138/99 |
| 5,971,030 A | | 10/1999 | Maimets ....................... 138/98 |
| 6,021,815 A | | 2/2000 | Kiest, Jr. et al. ............. 138/98 |
| 6,138,718 A | | 10/2000 | Maimets ....................... 138/98 |
| 6,810,753 B1 | * | 11/2004 | Valdevit et al. ........ 73/862.045 |

FOREIGN PATENT DOCUMENTS

| | | |
|---|---|---|
| CA | 1237682 | 6/1988 |
| CA | 2164011 | 6/2002 |

* cited by examiner

*Primary Examiner*—Patrick Brinson
(74) *Attorney, Agent, or Firm*—Howrey LLP (57) ABSTRACT

A method of repairing a section of pipe is described. The method includes applying a first split sleeve and a second split sleeve to the pipe section, functionally associating the first end of the first split sleeve with the first end of the second split sleeve, and applying a compressive force until the internal diameter of the pipe experiences compressive shear hoop strain. The method described produces substantially uniform compressive hoop strain along the length of the pipe section, and may exceed a predetermined value, such as 100 microstrain in compression, for example. The amount of force required may be calculated utilizing maximum operating conditions. The method described may produce an acceptable permanent repair by ensuring that the inner diameter of the section of pipe experiences compressive strain. Also described is a method of reinforcing a section of pipe utilizing these apparatus and methods.

22 Claims, 8 Drawing Sheets

COMPRESSION PIPE REPAIRING AND REINFORCING METHODS

CROSS REFERENCE TO RELATED APPLICATIONS

The present application claims priority to U.S. Provisional Patent Application Ser. No. 60/395,966 filed Jul. 15, 2002, the contents of which are incorporated herein by reference.

FIELD OF THE INVENTION

The present invention relates to a permanent reinforcing repair of gas and oil pipelines damaged by injurious defects. More specifically, methods are disclosed that apply a predetermined external mechanical force through a metal sleeve to permanently compress a pipe beneath such that the pipe experiences a substantially uniform, compressive hoop strain (i.e. strain measured on the inner diameter of the pipe) along its length to achieve an acceptable permanent repair of crack-like defects subjected to fluctuating loads. The method may include calculating the compressive force for the pipe under maximum operating conditions.

DESCRIPTION OF RELATED ART

The integrity of operating oil and gas pipelines can be adversely affected by damage caused by mechanical damage, corrosion, stress corrosion cracking, hydrogen induced cracking, or by other causes. Once the presence of such damage is confirmed, its severity is assessed to determine whether the detected damage constitutes an "injurious defect" (i.e. affecting the integrity of a pipeline to the extent that is not acceptable under the provisions of the applicable Code, such as section CSAZ662-99 Pipeline Code, the code herein incorporated by reference in its entirety).

If the detected damage is determined to be the injurious defect, the damage has to be repaired using acceptable repair methods. If the repair method is to be considered permanent, the repair method has to meet the requirements specified by applicable codes such as CSAZ662-99 Pipeline Code, Section 10.8.5. The basic method that is acceptable for permanent repair of all types of injurious defects involves physically removing and replacing the damaged section of the pipe. This requires the entire pipeline to be shut down, which may prove economically disadvantageous. Alternatively, a mechanically tightened steel reinforcement external sleeve, epoxy-filled steel sleeve, or fiberglass reinforcement sleeve can be applied to the pipe, provided the methods yield the desired acceptable permanent repair.

While these repair methods are used in the industry, they require pressure reduction in the pipeline in order to be performed. This is both costly and disruptive to the flow of product through the pipeline. Moreover, if installed at prevailing operating pressure, the external tight-fitting sleeves can become loose and separate from the pipe if the operating pressure later drops for any reason.

An additional external steel sleeve repair method has been developed in an attempt to overcome the limitation of a drop in operating pressure causing the sleeve to separate from the pipe. This method involves heating two sleeve halves uniformly to a predetermined temperature after the top and bottom halves of the sleeve have been tightened using hydraulic jacking devices. This temperature has to be maintained while the welding of the sleeve halves is being completed. Upon allowing the sleeve to cool, the sleeve shrinks, thus applying compressive forces onto the pipe.

While this method addresses the limitation of the prior sleeve repair methods and substantially reduces the risk of possible sleeve separation from the pipe after a pressure drop, some weaknesses remain that may limit its use under certain conditions.

Since achieving the uniform distribution of predetermined temperature of the sleeve for the extended period of time is dependent upon human operators, the level of compressive strain actually achieved in the pipe wall of the repaired section may vary broadly. This uncertainty may not be acceptable in those cases where the operator of the pipeline requires assurance that a specific level of a compressive strain is maintained in the pipe wall under all expected operating conditions. This would be typically required for repairing Stress Corrosion and other types of cracks and crack-like defects.

If this type of repair sleeve is installed at lower operating pressure than the one to be used in the future, an additional uncertainty may be introduced regarding the sleeve's ability to effectively contain such cracks after the operating pressure has been restored to the higher expected level. This increased uncertainty may not be acceptable to the operator who may need to select a repair alternative that provides more reliable control of this type of hazard.

Additionally, the need to uniformly heat the sleeve to fairly high temperature and maintain this temperature while the sleeve halves are being welded together is difficult to meet consistently under normal field conditions. This difficulty stems from the fact that the sleeve is in a very close contact with the operating pipeline that typically acts as a significant heat sink that causes the applied heat to dissipate rapidly. A significant heat application has to be sustained in order to overcome this heat dissipation. Moreover, manipulating several heat sources while the welding of the sleeve is in progress increases the level of safety hazard that is associated with this type of repair.

Numerous U.S. patents have been issued describing methods of repairing pipes. For example, U.S. Pat. No. 6,138,718 (issued Oct. 31, 2000) suggests the use of a tubular sleeve to be placed against the inner surface of a pipe to be repaired. The sleeve contains a gasket and a sealant, where the sealant adheres the sleeve and gasket to the inner surface of the pipe.

U.S. Pat. No. 6,021,815 (issued Feb. 8, 2000) offers a pipe repair apparatus containing an outer carrier tube, an inner bladder tube within the carrier tube, and a repair sleeve within the bladder tube. A sleeve of resin material is placed within the bladder tube, and is used to affect a repair of the inner pipe surface.

U.S. Pat. No. 5,971,030 (issued Oct. 26, 1999) discusses the use of a sleeve, curable sealant, and elastically compressible air bubbles to repair the inner surface of a high pressure pipe. The bubbles maintain a force against the sealant as it cures, preventing rebound of the sealant.

U.S. Pat. No. 5,950,683 (issued Sep. 14, 1999) suggests the use of a pair of half-sleeves, each containing a pair of mounting flanges to engage the other sleeve. Each sleeve has a compression ring, and a jacket of sealing material.

U.S. Pat. No. 5,372,162 (issued Dec. 13, 1994) offers an assembly of at least four short cylindrical, inflatable members which are interconnected by articulated rods. The assembly is used to repair the inside of a pipe by providing a cavity to receive filler material. The assembly is suggested to be especially useful for repairing small pipes or pipes that are located in difficult to reach areas.

U.S. Pat. Nos. 5,199,464 (issued Apr. 6, 1993) and 5,123,451 (issued Jun. 23, 1992) offer a pair of semi-cylindrical steel shells containing a heat sink groove. The shells are clamped against a pipeline, and are welded together. The inner surface of one of the shells contains a circular or oval recess. The system also includes an annular, flat seal element formed of a flexible, deformable, resilient material.

U.S. Pat. No. 4,889,370 (issued Dec. 26, 1989) provides a weldless pipe repair assembly made of two separate mating parts. A sealing sleeve is applied through a bore, and a locking assembly to promote a sealing engagement with the pipe.

U.S. Pat. No. 4,793,382 (issued Dec. 27, 1988) suggests an assembly for securing a repair sleeve within a damaged pipe. The assembly contains a tubular repair sleeve and a shape memory alloy element positioned within the sleeve and having a mandrel on each end with at least a portion of each mandrel extending beyond the sleeve at a respective end of the sleeve. When the shape memory alloy element recovers, the mandrels are moved towards one another so that each end portion of the sleeve is caused to expand outwardly.

U.S. Pat. No. 4,756,338 (issued Jul. 12, 1988) offers a pipe repair assembly made of two partial cylindrical pieces, one of which has a valve assembly attached. The valve is used to direct leaking fluids while the repair assembly is placed. Once the repair assembly is fully placed, the valve is closed to stop the leak.

Canadian Patent No. 1,237,682 (issued Jun. 7, 1988) provides a longitudinally split cylindrical sleeve that is applied to an internally pressurized pipe. One pair of ends are welded together along their length. The other pair of ends are equipped with shoulder lugs, and are drawn together using a clamping assembly. The ends are welded together when a sufficient degree of stress has been applied to the sleeve. Circumferential fillet welds are not required at the sleeve ends. However, as shown by the experimental data contained therein, the resulting repair of the pipe section fails to place the pipe section in compression, as the pipe section remains in tension after repair. Further, as evidenced by the experimental data contained therein, the resulting repair fails to provide uniform strain along the entire length of the pipe section.

The repair methods currently used in the industry are disruptive to pipeline operations, involve considerable dependence on the individual operators, and may present safety risks when heat sources are used near oil and gas supplies. Further, none of the prior art methods results in a repair that uniformly applies compressive hoop strain to the inner diameter of the pipe section along its entire length; nor do the prior art methods maintain this compressive strain under all operating conditions the pipeline may experience after the repair. Such a system should provide an acceptable permanent repair, for all operating conditions of the pipe. Thus, there exists a need for new materials and methods that can be used to repair damage to pipelines effectively while avoiding some or all of the shortcomings of the currently used methods.

SUMMARY OF THE INVENTION

Methods of repairing a section of pipe having a defect and rehabilitating a section of pipe having a defect are disclosed. The method includes a pipe having an internal diameter, the method comprising the steps of applying a first split sleeve and a second split sleeve to the pipe to partially circumscribe the pipe at the defect; functionally associating a first end of the first split sleeve to a first end of the second split sleeve; and applying a compressive force through both split sleeves with a compression unit until the internal diameter of the pipe experiences compressive hoop strain. The resulting compressive hoop strain is substantially uniform within the section of pipe, along the entire length of the section of pipe, being repaired. The compressive hoop strain may exceed a predetermined value, such as 100 microstrain in compression. An acceptable permanent repair may result.

The method may also include the step of determining the force or torque required to achieve the specified value of compressive hoop strain using the maximum operating conditions the pipe may experience after the repair is performed.

The method may also comprise utilizing two connector plates to connect the first and second split sleeves. In some aspects, the compressive force is measured by monitoring the distance between measurement marks.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

FIG. 2B shows an embodiment of the present invention having measurement marks.

DETAILED DESCRIPTION OF THE INVENTION

Aspects of the invention include devices and methods for the repair or prevention of defects in pipe structures such as oil and gas pipelines. Pipes 3 to be repaired can either have a detectable defect D, or can be suspected of developing a defect in the future and thus need reinforcement. Detection or suspicion of the defect can be accomplished by visual inspection, detection of stress, detection of fatigue, detection of leaking product from inside the pipe, or by any other method commonly used in the industry. The method by which the defect is identified or suspected is not critical.

Pipe Repair and Reinforcement Compression Devices

As will be described more fully below regarding methods of using the devices, the pipe repair compression methods are based on the concept of permanently applying a predetermined compressive force or torque on the pipe area adjacent to the defect D, such that the entire length of the pipe section will experience substantially uniform compressive hoop strain once repaired or reinforced. The method does not require the application of excessive amounts of heat. The devices can comprise, consist essentially of, or consist of the various discussed features.

The method can comprise using a device having a first split sleeve 1, a second split sleeve 2, and one or more compression units 6. Various additional elements can be added to the device, but are not required.

Figure 1:
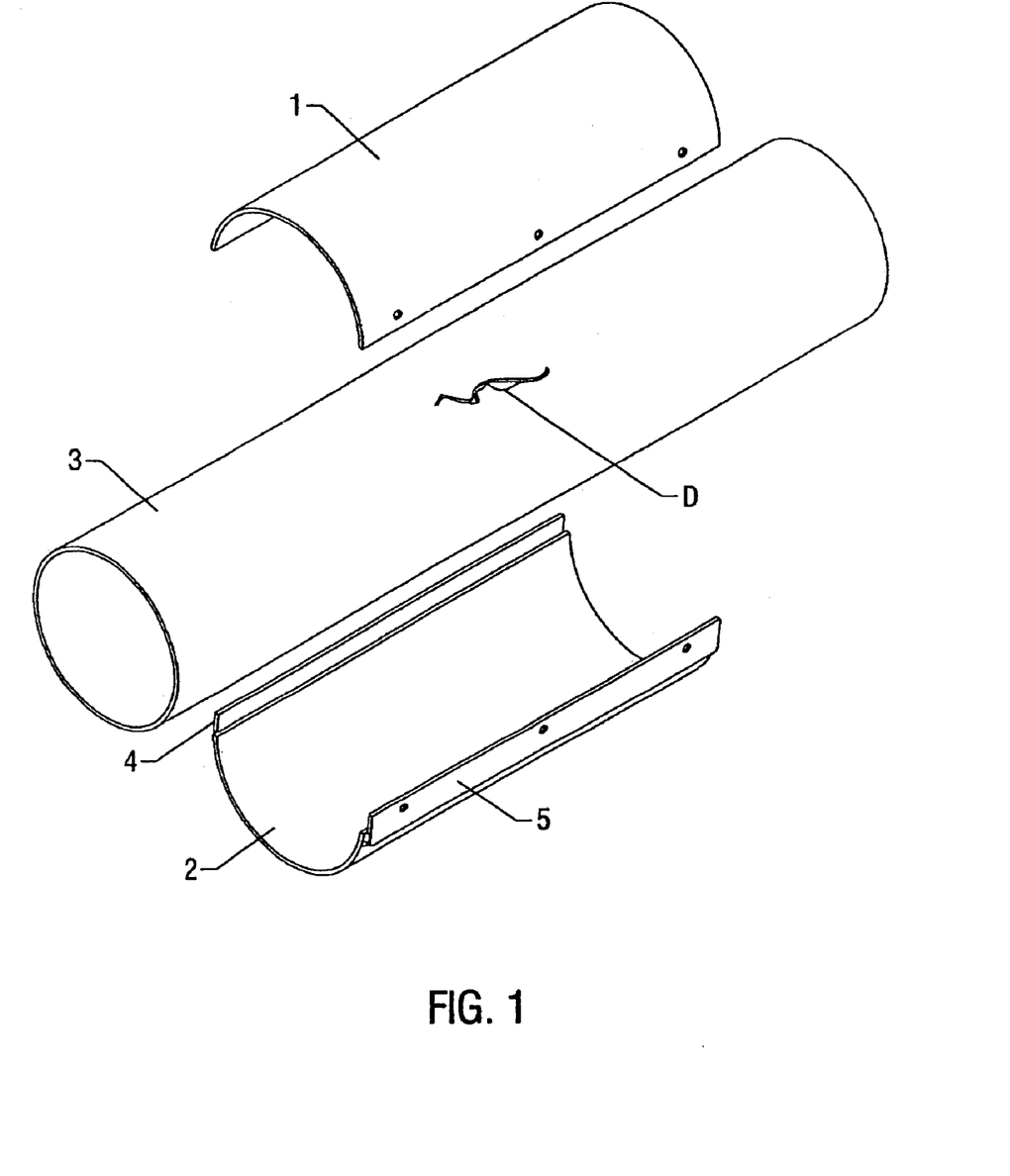
FIG. 1 shows a first and second split sleeve of one embodiment of the present invention prior to installation over the injurious defect in the pipe.

Referring to FIG. 1, pipe 3 is shown having a defect D. First split sleeve 1 and second split sleeve 2 are shown prior to installation. The first split sleeve 1 and second split sleeve 2 can be identical or different in size, shape, and thickness. The shape of the sleeves are such that they will lie in close contact when applied to the pipe 3. Typically, each of the sleeves would be a half cylinder shape (about 180 degrees each) for use with a cylindrical pipe. However, one sleeve could cover a larger portion of the pipe (i.e. have a longer radial length), and the other sleeve could cover a smaller portion of the pipe.

Typically, to repair an 18"-diameter pipe, the first split sleeve 1 and second split sleeve 2 may be constructed of steel, each being approximately 28" wide, 40" long, and ½" thick, depending upon the extent of the defect to be repaired to meet the design requirements of the applicable pipeline code. The length of the first and second split sleeves depends at least in part on the length of the defect D. The length of the sleeves should be at least four inches longer than the defect.

Referring to FIG. 1, second split sleeve 2 has a first connector plate 4 attached to one side with a second connector plate 5 attached to the other, as will be discussed more fully hereinafter. The device typically can comprise one or two connector plates, one for each region where the first and second split sleeves meet. The connector plates 4 and 5 can be attached to first split sleeve 1 or to second split sleeve 2. The connector plate can be made of the same material as the first and/or second split sleeve, or can be made of a different material. The connector plate can be made of any of the materials that meet the requirements of the applicable pipeline code. The connector plate can be welded or otherwise adhered to the first or second split sleeve. Alternatively, the connector plate can be prepared as an extension of the first or second split sleeve during preparation of the first or second split sleeve (i.e. the connector plate is an extension of the sleeve).

Figure 2A:
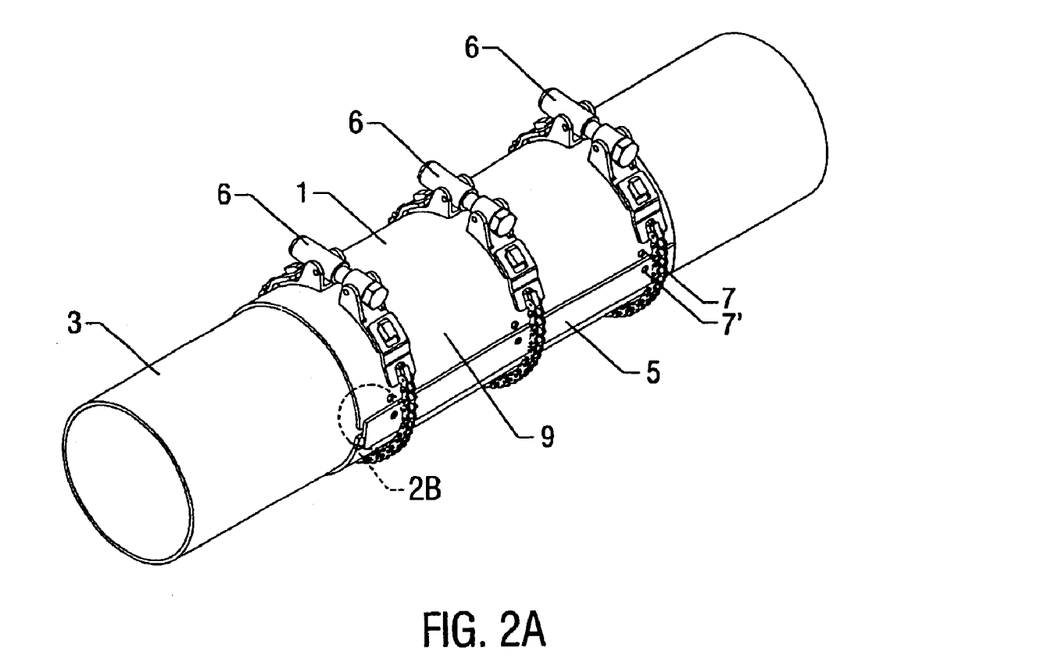
FIGS. 2A and 2B show the split sleeves during installation with a compression unit such as a turnbuckle and chain clamps applying the required compressive force or torque while the first and second split sleeves are applied to the pipe section.
Figure 2B:
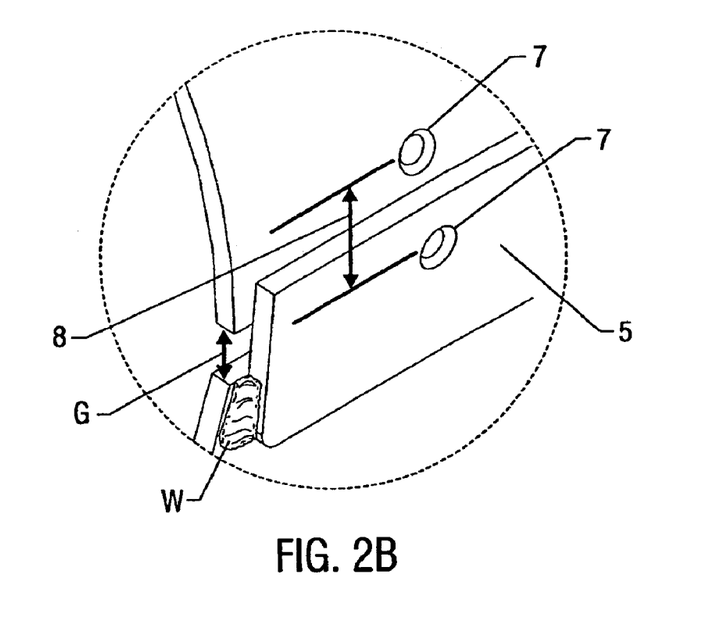

Referring to FIGS. 2A and 2B, the first split sleeve 1 and second split sleeve 2 are shown placed around the section of pipe 3 to be repaired. One or more compression units 6 may be utilized to movably secure the first split sleeve 1 and second split sleeve 2 around the pipe 3. The one or more compression units 6 can be the same or different in structure. Generally, any compression units that can compress the first split sleeve 1 and second split sleeve 2 can be used in the inventive device. Examples of compression units include turnbuckles/chains (as shown in FIG. 2 or other embodiments as described herein), top and bottom clamp assembly with stud and hex nuts (as discussed with respect to FIGS. 6C and 6D), or any other unit that may supply the compressive forces as hereinafter described. The device can comprise one compression units, two compression units, three compression units, four compression units, five compression units, six compression units, and so on.

FIG. 2B shows a detailed view of the second connector 5 plate being attached to the second split sleeve 2 by weld W. As shown, the first split sleeve 1 has one or more compression measurement marks 7. Also shown is compression measurement mark 7' on the second connector plate 5. Any number of compression measurement marks 7 and 7' may be utilized. For example, the first split sleeve 1 can comprise one or more measurement marks 7. Similarly, the second connector plate 5 can comprise one or more measurement marks 7'. As shown in FIG. 2B, the distance 8 may is measured as the distance between mark 7 and mark 7'. As the first and second split sleeves are compressed, the distance 8 will be reduced. This distance 8 can be used as a gauge of the degree of compression. Multiple marks 7 and 7' can be positioned along the length of the first and second split sleeves to allow multiple distances 8 to be measured. If the sleeves are being compressed evenly, the reduction in distance 8 should be about the same between all of the paired marks 7 and 7'.

Figure 3:
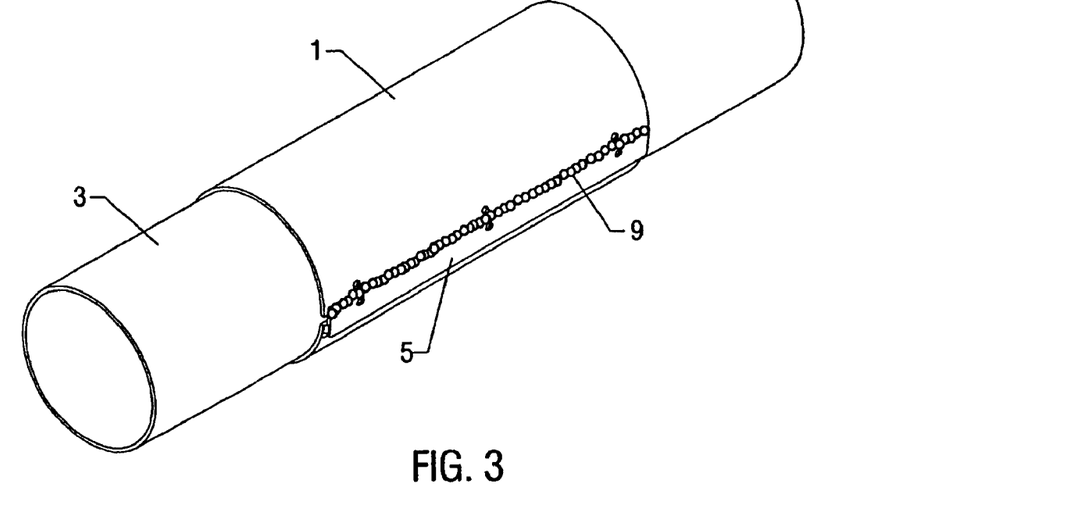
FIG. 3 shows the first and second split sleeves installed over the injurious defect in the pipe.

Referring to FIG. 3, pipe 3 is shown with the first split sleeve 1 and second split sleeve 2 compressed and securely attached by weld 9. The compression devices 6 have been removed.

Figure 4A:
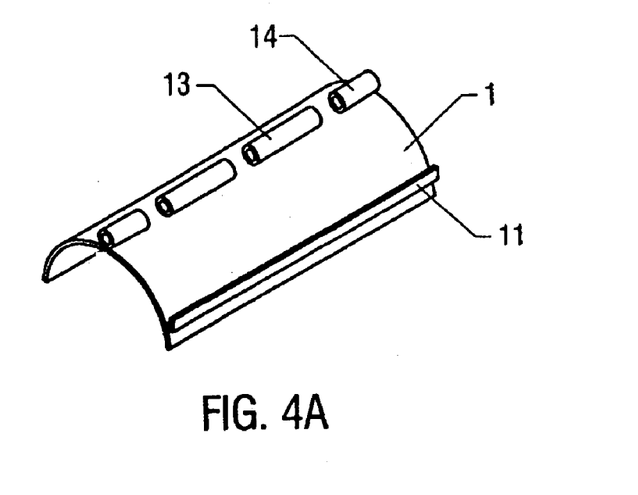
FIGS. 4A–C show an embodiment of the first split sleeve 1 of one embodiment of the present invention in isolation and detail.
Figure 4B:
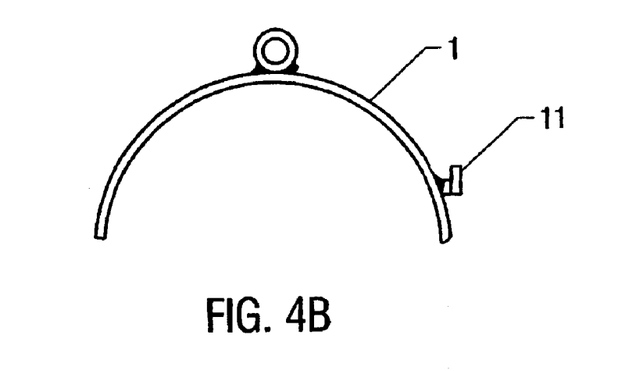
Figure 4C:
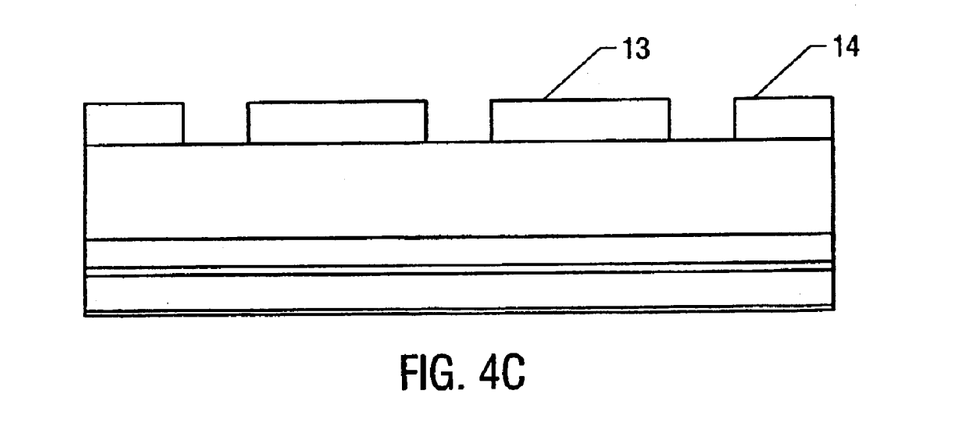

FIGS. 4A–C show another embodiment of the present invention in which the first split sleeve 1 is shown further comprising two pipe sections 13 and 14. Pipe sections 13 and 14 may have the same length, or pipe section 14 may have length which is less than the length of pipe section 13. As will be described hereinafter, the connection unit may be attached to the first split sleeve 1 via the pipe sections 13 and 14 as described hereinafter. In this figure, the second connector plate (item 5 in FIGS. 1–2) is shown comprising a pocket assembly 11 attached to first split sleeve 1. In this case, the pocket assembly 11 is welded to the first split sleeve 1, although any other connection means may be utilized. The pocket assembly and the first split sleeve 1 may or may not have measurement marks (shown as 7 and 7' in FIG. 1).

Figure 5A:
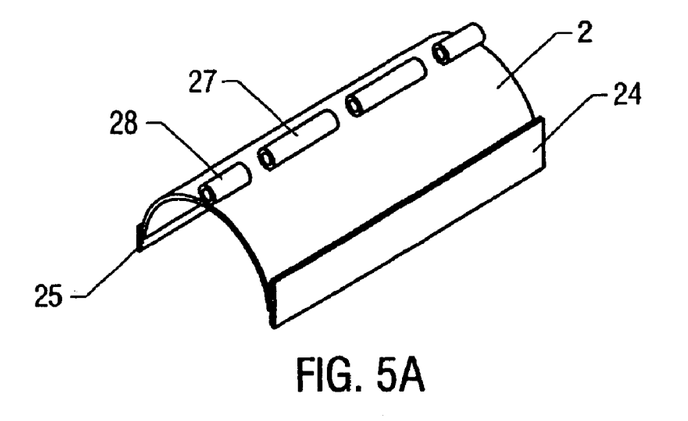
FIGS. 5A–C show an embodiment of the second split sleeve 2 of one embodiment of the present invention in isolation and detail.
Figure 5B:
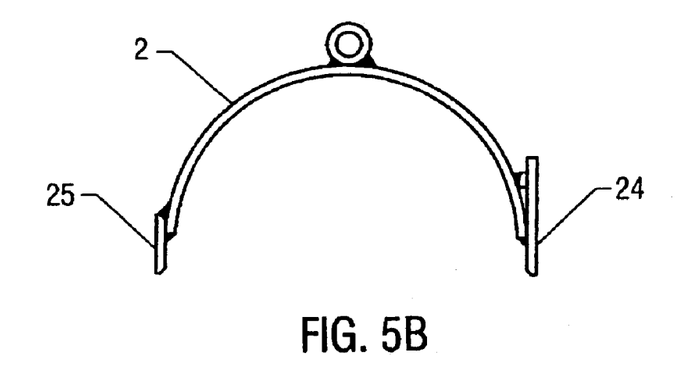
Figure 5C:
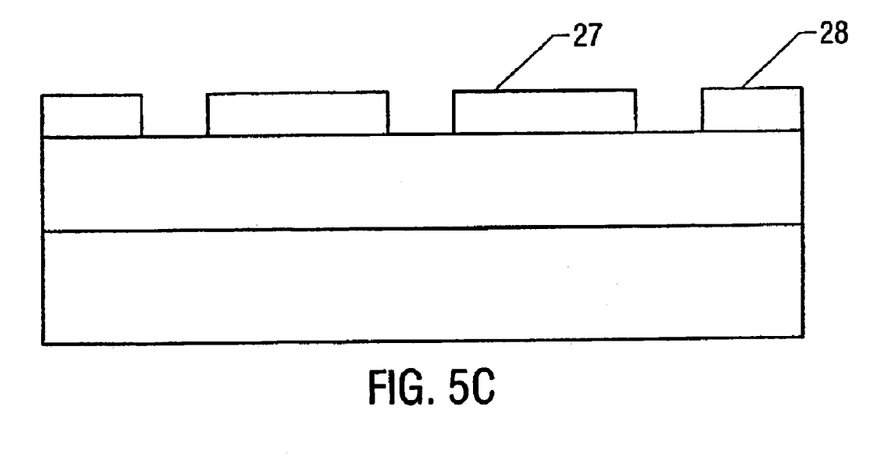

Referring to FIGS. 5A–C, the second split sleeve 2 is shown further comprising two pipe sections 27 and 28. Pipe section 27 and 28 may have the same length, or pipe section 28 may have length which is less than the length of pipe section 27. As will be described hereinafter, the compression unit 6 may be attached to the second split sleeve 2 via the pipe sections 27 and 28 as described hereinafter. In this figure, the first connector plate (item 4 in FIGS. 1–2) is shown as flat bar 25. Further, second connector plate is shown as comprising second pocket assembly 24 attached to second split sleeve assembly 2. In this case, the second pocket assembly 24 is welded to the first split sleeve 1, although any other connection means may be utilized. The second pocket assembly and the second split sleeve 2 may or may not have measurement marks (shown as 7 and 7' in FIG. 1).

Figure 6A:
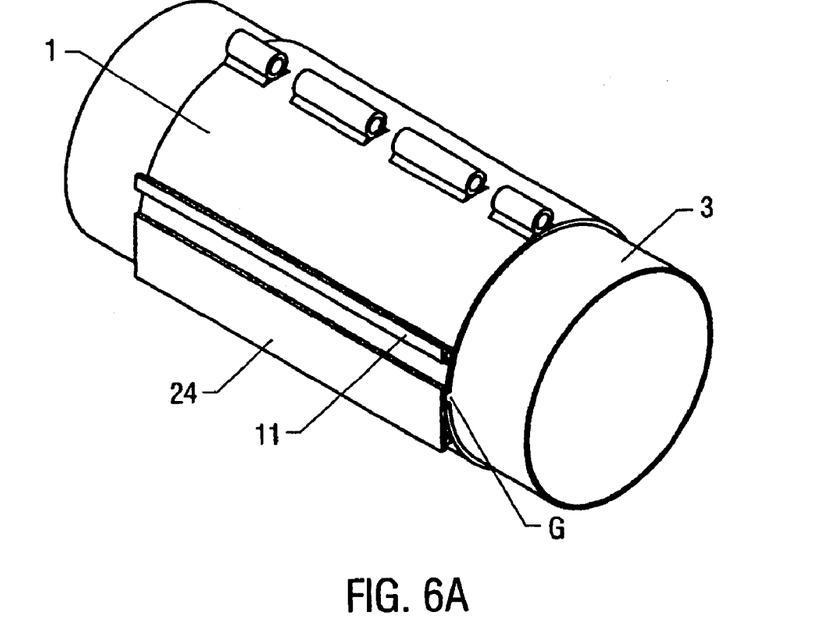
FIGS. 6A and 6B show the embodiments of the present invention applied to the pipe section 3 to be reinforced or repaired.
Figure 6B:
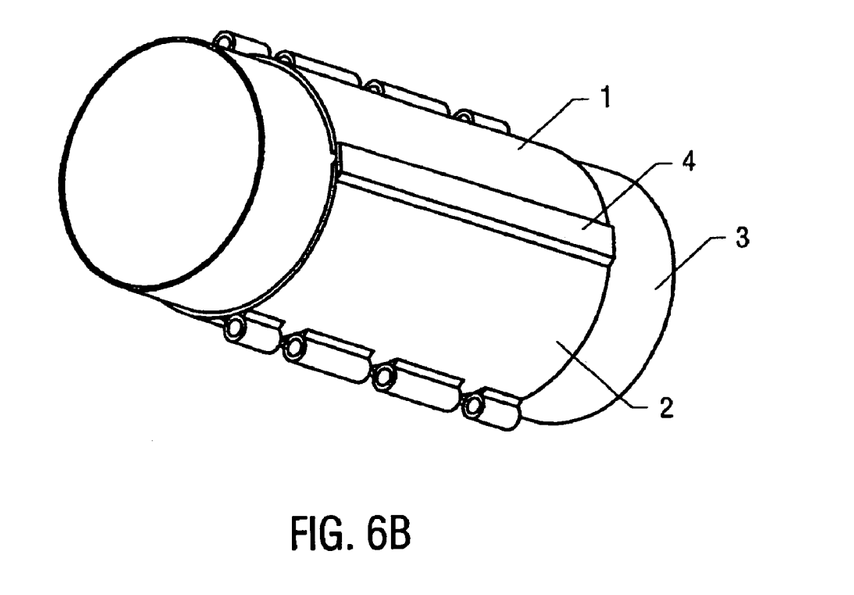
Figure 6C:
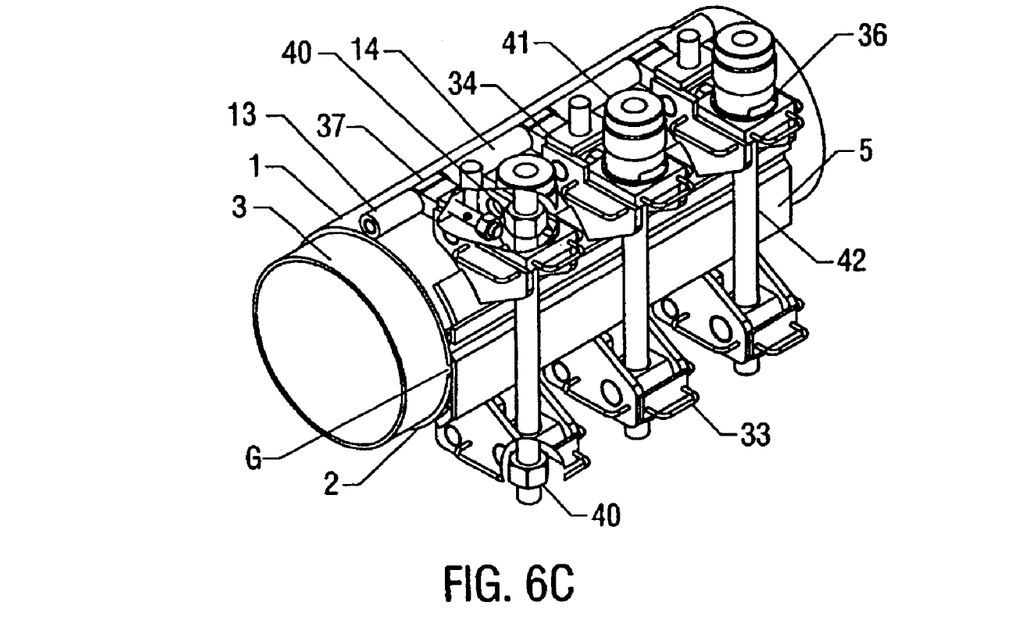
FIGS. 6C and 6D show an embodiment of a compression unit in isolation of one embodiment of the present invention, 6C also including a cut-away view.
Figure 6D:
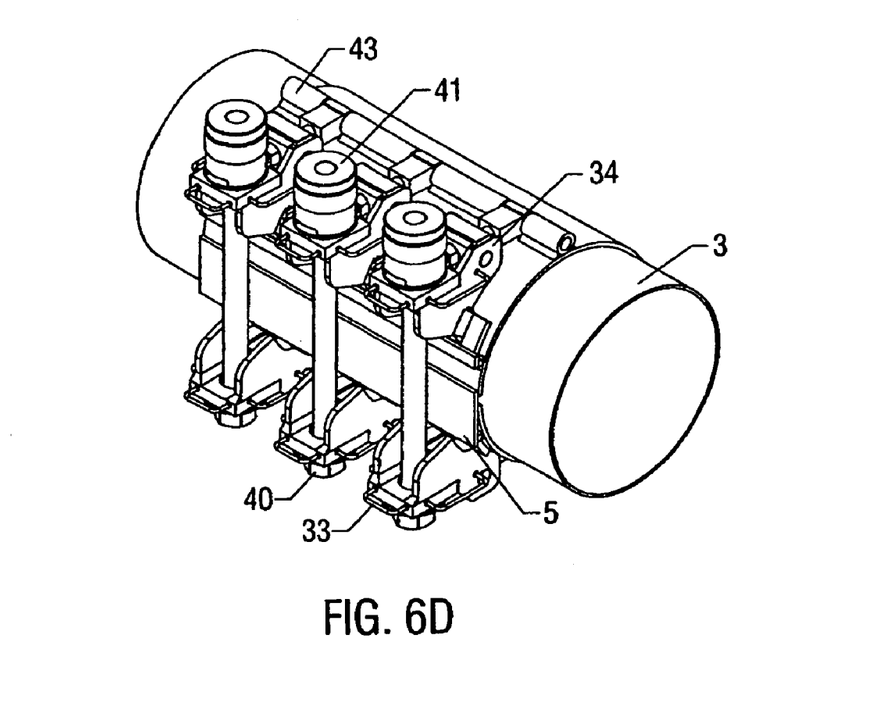

FIGS. 6A and 6B show this embodiment of the present invention in which the second ends of the first split sleeve 1 and second split sleeve 2 are functionally associated to be indirectly connected by the second connector plate (here comprising first and second pocket assemblies 11 and 24) overlapping the gap G between the second ends. In this way, the first split sleeve 1, second 2, and the second connector plate (i.e. first and second pocket assemblies 11 and 24 here) circumscribe the pipe 3 section. FIGS. 6C and 6D show an embodiment of the present invention in which the compression unit 6 is further comprised by a top clamp assembly 34.

Top clamp assembly 34 is hingedly mounted to the first split sleeve 1 by a bar 37 passing through pipe sections 13 and 14 of FIGS. 4A–4C. Bottom clamp assembly 33 may similarly be hingedly attached to second split sleeve 2 by passing a bar (not shown) through pipe sections 27 and 28 (shown in FIGS. 5A–C). The top clamp assembly 34 is movably attached to the bottom clamp assembly 33 via stud 42 which is threaded on its lower end and/or its upper end. As will be described more fully herein, by tightening hex nuts 40, the distance between the top and bottom assemblies 34 and 33 is reduced, thus producing a uniform compressive force on the pipe section 3. Top clamp assembly 34 may further comprise a stud tensioner 41.

Finally, FIGS. 7A–7E show various views of the top clamp assembly 34 of one embodiment of the present invention. In these figures, the top clamp assembly 34 is shown comprised of reaction pin 58, reaction pin plate 57, long handle 55, short handle 56, each attached to a body. Although this embodiment of the invention includes the top clamp assembly 34 as shown in FIGS. 7A–7E, any number of bottom or top clamp assemblies could be utilized, as would be known to one of ordinary skill in the art having the benefit of this disclosure.

Methods of Use

The above described pipe repair compression devices can be used to repair or reinforce a section of pipe 3. The device can be used to repair a section of pipe that has exhibited some form of detectable damage D. Alternatively, the sleeve can be used to reinforce a section of pipe that is suspected of weakening or suspected of being vulnerable to damage in the future, even though no currently visible damage is apparent or detectable.

The methods of using the pipe repair compression devices can comprise identifying a section of pipe containing or suspected of containing a defect, applying a first split sleeve and a second split sleeve to the pipe, where the first or second split sleeve covers the defect, welding or otherwise functionally connecting the first ends of the first split sleeve and second split sleeve, applying one or more compression units to the first and second split sleeves, and applying a compressive force to the first and second split sleeve.

Prior to use of the pipe repair compression device, the external force required to produce the specified compressive strain on the inner diameter of the pipe wall can be calculated using mechanical engineering principles known to one of skill in the art. The external compressive force can be determined by engineering calculations to be of adequate magnitude to replace the tensile hoop strain in the pipe wall beneath the sleeve, with an evenly distributed compressive strain that is greater than a specified minimum value, such as 100 microstrain in compression, under the current as well as maximum operating conditions (such as pressures and temperatures, e.g.) that the section of pipe is expected to experience in the future.

The surface of the pipe section can be cleaned, as can the internal surfaces of the first and second split sleeves. Cleaning can be performed generally by any method, such as mechanically (i.e. by brushing contaminants off the pipe surface), chemically (applying a cleaning agent to the surface of the pipe section), a combination of both, or by any other cleaning means known to one of ordinary skill in the art. The first and second split sleeves can be dry-fitted to the pipe to verify fit, and to measure the level of force required to achieve an acceptable fit.

A filler or adhesive material can be applied to the pipe surface prior to applying the first and second split sleeve. Example materials include epoxy, polyurethane, etc.

The first ends of the first and second split sleeves 1 and 2 may be functionally associated in various ways. For instance in these embodiments, the first ends of first and second split sleeves 1 and 2 may be directly attached to each other. Alternatively, the first ends of first and second split sleeves 1 and 2 may be indirectly attached to each other by attaching the first connector plate to each first end such that gap G is overlapped.

A first end of the first split sleeve is then fixedly connected to a first end of the second split sleeve, either directly, or indirectly by a first connector plate 4, for example. At this point, the first and second split sleeves do not entirely circumscribe the pipe section, as a gap G exists between the second ends of the first and second split sleeves, as shown in FIG. 2B.

If the sleeves and/or a second connector plate are marked with compression measurement marks 7 and 7' as shown in FIG. 2B, the distance 8 between the two split sleeves, or between one of the sleeves and the second connector plate, can be used to monitor the degree of compression applied by the compression units 6. Preferably, the distance 8 is measured with a high degree of accuracy, such as about plus/minus 0.1 mm or about plus/minus 0.05 mm. Preferably, multiple marks 7 and 7' are used to allow multiple distances 8 to be measured.

Excess filler or adhesive material may be squeezed out from the first and second split sleeves during compression. This excess material can be removed if desired.

Compression of the sleeves is continued until the predetermined compression force has been fully applied. The second ends of first and second split sleeves are then fixedly attached, either directly (connecting the second ends together directly, e.g. by welding) or indirectly via second connector plate to connect the second ends of the sleeves. This connection may be performed by welding the second connector plate to each of the second ends of the first and second split sleeve. The regions neighboring the second ends of the first and second split sleeves can be preheated to an elevated temperature (such as about 50° C.) prior to connecting in order to remove any residual moisture that may be present.

Depending on the type and number of compression units used, the connecting step may have to be performed in several stages. For example, if turnbuckles and chains are used, the chains would likely have to be individually removed in order to weld or otherwise connect the region connecting the first and second split sleeve lying under the chain. In such a situation, the remaining compression units would maintain proper compression while one is disengaged in order to facilitate connection.

One or more connections can be performed. For example, one, two, three, or four overlapping welds can be applied. Connection under the last compression unit can be performed, as the remaining portion of region would already be connected. Once the connections have been performed, the first and second split sleeves, in conjunction with the second connector plate, form a single integral unit circumscribing the pipe that maintains a compressive force on the pipe.

Optionally, electrical resistance between the sleeves and pipe can be measured to confirm that a condition of full cathodic protection was achieved. Also, an external coating can be applied to the entire repair area to finish the work.

Now referring to the embodiment of the invention shown in FIGS. 4A–7E, a method of repairing a section of pipe will be describe. A section of pipe 3 requiring to be repaired or reinforced is selected. Based on the geometries of the section of pipe, the amount of compressive force required to produce at least 100 microstrain in compression on the inner diameter of along the entire length of the repaired section of pipe is calculated (as described above), the compressive force being calculated for the maximum operating conditions (e.g. temperature and pressure) that the section of pipe will experience over time, after the repair.

Based on this determination of the required compressive force, the repair can be performed at operating pressure lower than its anticipated maximum and ensure that at least 100 microstrain in compression will be maintained on the inner diameter along the entire length of the repaired pipe section if and when the internal pressure is increased to its maximum value.

The outer surface of the section of pipe is cleaned, as are the inner surfaces of first split sleeve 1 and second split sleeve 2. The first and second split sleeves 1 and 2 may be dry-fitted on the section of pipe. Epoxy is applied to the outer surface of the section of pipe 3, and first and second split sleeves 1 and 2 are applied to the section of pipe 3 partially circumscribe the pipe section 3.

Figure 7A:
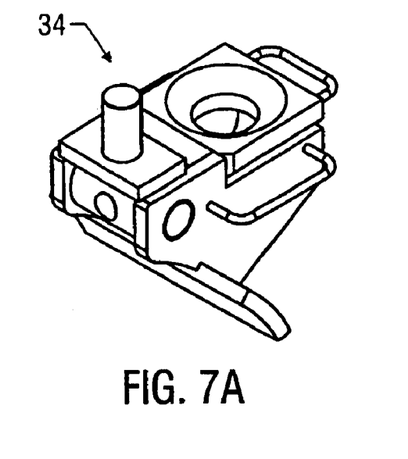
FIGS. 7A–E show an example of a top clamp assembly of one embodiment of the present invention in isolation.
Figure 7B:
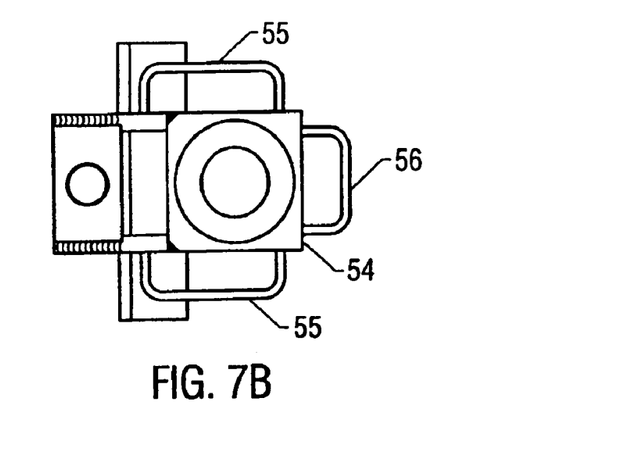
Figure 7C:
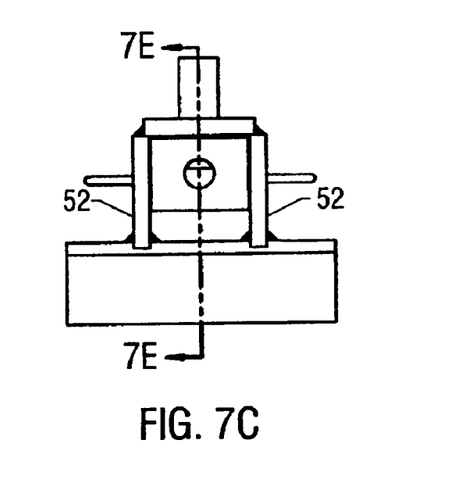
Figure 7D:
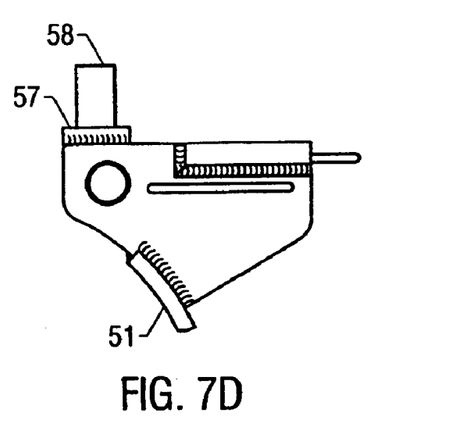
Figure 7E:
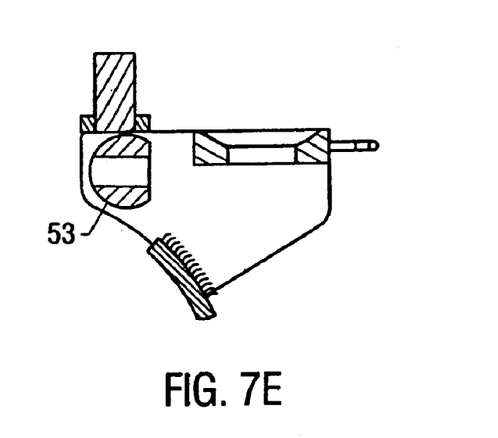

The first end of the first and second split sleeves 1 and 2 are then fixedly attached, either directly or in conjunction with the first connector plate 4. For example, first connector plate (shown as 4 in FIG. 1 and may comprise a flat bar 25 as shown in FIG. 7) may be connected to overlap both the first ends of the first and second split sleeves 1 and 2, for example by welding. The first and second split sleeves thus partially circumscribe the section of pipe to be repaired or reinforced, as the second ends of the first and second split sleeves are not yet connected.

The predetermined amount of compressive force (as determined above) is than applied to the first and second split sleeves by a compression unit 6 (e.g. turnbuckles/chains 6 in FIG. 2A or top clamp assembly 34, bottom clamp assembly, stud 42, and hex nut 40 of FIGS. 4A–7E). When the latter connection unit is utilized, hex nut 40 is tightened, thus bringing the top and bottom clamp assemblies closer together. Because the top clamp assembly 34 is connected to the first split sleeve 1 and the bottom clamp assembly is connected to the second split sleeve 2 (by being hingedly mounted to each section by rods passing bars through pipe sections 13, 14 and pipe sections 27 and 28 respectively, as described above), the compressive force is transmitted through pocket assemblies 11 and 24 into each split sleeve. This ensures a uniform application of the force to the pipe section. Compressive force is applied until its value reaches the desired value described above which is sufficient to place the inner diameter of the pipe section into compression such that the inner diameter experiences 100 microstrain in compression substantially uniformly along the entire length of the pipe section. A permanent acceptable repair is thus achieved, having substantially uniform microstrain along the length of the section of pipe.

In some embodiments, the second ends of the first and second split sleeves 1 and 2 are then connected, for instance by welding a second connector plate (shown as 5 in FIG. 2 and may further comprise pocket assemblies 11 and 24 as shown, in FIGS. 4A–C and 5A–C) to both the first and second split sleeves 1 and 2 while continuously applying the compressive force. The second ends of the first and second split sleeves 1 and 2 may be functionally associated in various ways. The second ends of the first and second split sleeves may be directly attached to each other, provided the sleeves are sized to accommodate a given section of pipe.

Alternatively, the second ends of the first and second split sleeves may be indirectly attached to each other via second connector plate, by attaching the second connector plate to each second end such that gap G is overlapped.

In these embodiments using connector plates, the first and second connector plates may be pre-installed on second split sleeve 2 to reduce installation time at the site. In some embodiments, the compression unit 6 may then be removed so that the compression unit may be utilized in subsequent repairs or reinforcements of other sections of pipe. Because the first and second split sleeves are fixedly attached to the pipe section, the inner wall of the section of pipe continues to experience compressive strain substantially uniformly along the length of the pipe section.

The following examples are included to demonstrate embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

To verify the efficacy of one embodiment of the above-described methods, an experiment was performed utilizing the apparatus and method described above with respect to FIGS. 4A–7E. Prior to performing the method, strain gages were applied to the inner diameter of the section of pipe to be repaired or reinforced along the entire length of the pipe section.

Compressive force was then calculated and applied as described above and measurements from the various strain gages were recorded over time. As can be seen from the following three tables, as the compressive force was calculated and applied, the section pipe, originally experiencing tensile hoop strain (shown here as positive values) at the installation pressure of 435 p.s.i., subsequently experienced compressive hoop strain excess over 100 microstrain in compression (shown here as negative values) after the repaired section was pressurized to the specified maximum operating pressure of 740 p.s.i. In this way, the method described herein will achieve an acceptable permanent repair as desired. Also, as shown by the following data, the method disclosed further yields substantially uniform compressive shear strain along the entire section of pipe to be repaired or reinforced.

Samples of Experimental Results

Samples of experimental data are provided in the Tables 1, 2 and 3 that show the values of hoop strains measured at four different locations of the pipe section under the repair sleeve.

The strain gauge locations are specified as follows:
Gauge 5H: at 2:00 o'clock position and 85 cm (33.5") from the first and second split sleeve edges at a location on the inner diameter of the pipe at a location along the pipe section length under the top clamp assembly;
Gauge 6H: at 3:15 o'clock position and 15 cm (5.9") from first and second split sleeve edges, between the top and bottom clamp assembly;

Gauge 8H: at 4:45 o'clock position and 50 cm (19.7") from the first and second split sleeve edges, just outside the bottom clamp assembly;

Gauge 14H: at 7:45 o'clock position and 50 cm (19.7") from first and second split sleeve edges near the center of the second split sleeve.

TABLE 1

Sample Experimental Results
(During incremental application of the Compressive Force to its Required value (as calculated as described above) while the installation pressure within the pipe of 435 P.S.I. remains constant)

| Compressive Force Applied by the three Clamps of the compression unit [% of Required Compressive Force] | Strain Gauge 5 H [microstrain] | Strain Gauge 6 H [microstrain] | Strain Gauge 8 H [microstrain] | Strain Gauge 14 H [microstrain] |
|---|---|---|---|---|
| 0 | −104 | −228 | +11 | +119 |
| 8 | +368 | −597 | +136 | −231 |
| 86 | +1325 | −3037 | −1313 | −432 |
| 100 | +1410 | −3027 | −1627 | −470 |

Note:
Negative Strain readings denote compression

TABLE 2

Sample Experimental Results
(After Application of the Required Compressive Force, welding and removal of the Compression Unit while the Installation Pressure within the pipe of 435 P.S.I. remains constant)

| Compressive Force Applied by the compression unit [% of Required Compressive Force] | Strain Gauge 5 H [microstrain] | Strain Gauge 6 H [microstrain] | Strain Gauge 8 H [microstrain] | Strain Gauge 14 H [microstrain] |
|---|---|---|---|---|
| 0 Clamps of the compression unit completely removed | −998 | −1492 | −1158 | −1121 |

Note:
Negative Strain readings denote compression

TABLE 3

Sample Experimental Results
(After 10$^{th}$ Pressure Cycle to the specified Maximum Operating Pressure of 740 PSI)

| Compressive Force Applied by the three Clamps of the compression unit [% of Required Compressive Force] | Strain Gauge 5 H [microstrain] | Strain Gauge 6 H [microstrain] | Strain Gauge 8 H [microstrain] | Strain Gauge 14 H [microstrain] |
|---|---|---|---|---|
| 0 Clamps completely removed | −1018 | −1153 | −897 | −1006 |

Note:
Negative Strain readings denote compression

All of the compositions and/or methods and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and/or processes and in the steps or in the sequence of steps of the methods described herein without departing from the concept and scope of the invention. More specifically, it will be apparent that certain materials which are chemically and mechanically related may be substituted for the agents described herein while the same or similar results could be achieved. All such similar substitutes and modifications apparent to those skilled in the art are deemed to be within the scope and concept of the invention.

What is claimed is:

1. A method of repairing a section of pipe having a defect, the pipe having an internal diameter, comprising:
    applying a first split sleeve and a second split sleeve to the pipe to partially circumscribe the pipe at the defect;
    functionally associating a first end of the first split sleeve to a first end of the second split sleeve, by connecting a first connector plate to the first end of the first split sleeve and connecting the first connector plate to the first end of the second split sleeve; and
    applying a compressive force with a compression unit until the internal diameter of the pipe experiences compressive hoop strain.

2. The method of claim 1 wherein the compressive hoop strain is substantially uniform within the section of pipe, along a length of the section of pipe, being repaired.

3. The method of claim 1 wherein the compressive hoop strain is at least 100 microstrain in compression.

4. The method of claim 3 wherein the steps of applying the first split sleeve, functionally associating the first end of the first split sleeve, and applying a compressive force are performed when the pipe section is at an installation pressure, the at least 100 microstrain in compression being experienced when the pipe is at a maximum operating pressure.

5. The method of claim 1 wherein the resulting repair is an acceptable permanent repair.

6. The method of claim 1 further comprising:
    functionally associating a second end of the first split sleeve and a second end of the second split sleeve to circumscribe the pipe subsequent to applying the compressive force.

7. The method of claim 6 wherein the step of functionally associating the second end of the first split sleeve and the second end of the second split sleeve further comprises:
    connecting a second connecting member to overlap a gap between the second end of the first split sleeve and the second end of the second split sleeve, wherein the first split sleeve, the second split sleeve and the second connecting member circumscribe the section of pipe.

8. The method of claim 7 wherein is step of connecting the second connecting member comprises welding.

9. The method of claim 7 further comprising:
    removing the compression unit after connecting the second end of the first split sleeve to the second end of the second split sleeve.

10. The method of claim 9 further comprising cleaning an outer surface of the pipe pilot to applying the first split sleeve and the second split sleeve to the pipe.

11. The method of claim 11 further comprising cleaning an inner surface of the first split sleeve and an inner surface of the second split sleeve prior to applying the first and second split sleeve.

12. The method of claim 11 further comprising dry-fitting the first split sleeve and the second split sleeve to the pipe following the step of cleaning.

13. The method of claim 12 further comprising applying epoxy filler to the outer surface of the pipe prior to applying the first split sleeve and the second split sleeve to the pipe.

14. The method of claim 9 in which the step of applying the compressive force further comprises:

measuring a distance between a first measurement mark on the first split sleeve and a second measurement mark on the second connector plate.

15. The method of claim 11 further comprising:
determining the force required to achieve using maximum operating conditions under which the pipe operates prior to applying the force.

16. The method of claim 15 wherein the step of determining the force further comprises determining the force required to achieve at least 100 compressive microstrain on the inner diameter of the pipe after an installation pressure is increased to a specified maximum operating pressure.

17. The method of claim 16 in which the step of applying the force further comprises tightening a hex nut on a stud connecting a top assembly on the first split sleeve and a bottom assembly on the second split sleeve.

18. The method of claim 17 further comprising hingedly attaching the top assembly to the first split sleeve and hingedly attaching the bottom assembly to the second split sleeve.

19. The method of claim 1 wherein the compressive hoop strain is 100 microstrain in compression.

20. The method of claim 19 wherein the steps of applying the first split sleeve, functionally associating a first end of the first split sleeve, and applying a compressive force are performed when the pipe section is at an installation pressure, the at least 100 microstrain in compression being experienced when the pipe is at a maximum operating pressure.

21. The method of claim 1 wherein the resulting repair is an acceptable permanent repair.

22. A method of reinforcing a section of pipe having a defect, the pipe section having an internal diameter comprising:

applying a first split sleeve and a second split sleeve to the pipe section to partially circumscribe the pipe at the defect;

connecting a first end of the first split sleeve to the end of the second split sleeve;

connecting a connecting member to overlap a gap between the second end of the first split sleeve and the second end of the second split sleeve, wherein the first split sleeve, the second split sleeve and the connecting member circumscribe the section of pipe;

determining the force required to achieve using maximum operating conditions under which the pipe operates;

applying a compressive force with a compressive unit, by tightening a hex nut on a stud connecting a top assembly on the first split sleeve and a bottom assembly on the second split sleeve, until the internal diameter of the pipe experiences compressive shear hoop strain, wherein the compressive hoop strain is substantially uniform and exceeds a predetermined value along a length of the section of pipe being repaired; and removing the compression unit after connecting the second end of the first split sleeve to the second end of the second split sleeve.

* * * * *

UNITED STATES PATENT AND TRADEMARK OFFICE
CERTIFICATE OF CORRECTION

PATENT NO. : 7,066,210 B1
APPLICATION NO. : 10/619836
DATED : June 27, 2006
INVENTOR(S) : Dale Kakoschke, Ruben Pavon and Mirek Urednicek It is certified that error appears in the above-identified patent and that said Letters Patent is hereby corrected as shown below:

In claim 10, line 2, replace --pilot-- with "prior"

In claim 11, line 1, change --claim 11-- to read "claim 10"

In claim 15, line 1, change --claim 11-- to read "claim 9"

In claim 22, line 7, change --to the end-- to read "to a first end"

Signed and Sealed this

Fifth Day of September, 2006

JON W. DUDAS
*Director of the United States Patent and Trademark Office*